United States Patent
Ochi et al.

(10) Patent No.: US 7,762,065 B2
(45) Date of Patent: Jul. 27, 2010

(54) STATOR SUPPORT STRUCTURE FOR A TORQUE CONVERTER

(75) Inventors: Toru Ochi, Aichi-ken (JP); Hiroaki Takeuchi, Toyota (JP); Kensuke Sakamoto, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 397 days.

(21) Appl. No.: 11/896,662

(22) Filed: Sep. 5, 2007

(65) Prior Publication Data

US 2008/0185257 A1 Aug. 7, 2008

(30) Foreign Application Priority Data

Sep. 6, 2006 (JP) ............... 2006-242104

(51) Int. Cl.
*F16H 41/24* (2006.01)
*F16D 33/00* (2006.01)
(52) U.S. Cl. ............... 60/345; 60/341; 60/361
(58) Field of Classification Search ........... 60/330, 60/339, 341, 345, 361
See application file for complete search history.

(56) References Cited

U.S. PATENT DOCUMENTS

| 5,125,487 A * | 6/1992 | Hodge ................ 60/345 |
| 6,044,946 A * | 4/2000 | Makino et al. ........ 60/361 |
| 6,814,203 B2 * | 11/2004 | Kamiya et al. ....... 192/45.1 |
| 7,036,306 B2 * | 5/2006 | Sato ................ 60/345 |
| 2004/0076522 A1 * | 4/2004 | Ochi et al. ........... 60/330 |

FOREIGN PATENT DOCUMENTS

| JP | 2003-83339 | 3/2003 |
| JP | 2003-343690 | 12/2003 |
| JP | 2004-132526 | 4/2004 |
| JP | 2006-170345 | 6/2006 |
| JP | 2007-177969 | 7/2007 |

OTHER PUBLICATIONS

Chinese Office Action dated Jan. 16, 2009.
Japanese Office Action dated Nov. 11, 2008.

* cited by examiner

*Primary Examiner*—Thomas E Lazo
(74) *Attorney, Agent, or Firm*—Finnegan, Henderson, Farabow, Garrett & Dunner, LLP

(57) ABSTRACT

A stator support device for a torque converter having a stator wheel and a non-rotating member has a one-way clutch and a bearing race. The one-way clutch includes an outer race disposed along the inner periphery of the stator wheel, an inner race connected to the outer periphery of the non-rotating member to prevent rotation of the inner race relative to the non-rotating member, and an end bearing provided between the outer race and the inner race. The bearing race is disposed at a side face of the outer race. The bearing race is supported so as to be rotatable in the circumferential direction. A gap is formed between the bearing race and the stator wheel.

8 Claims, 4 Drawing Sheets

STATOR SUPPORT STRUCTURE FOR A TORQUE CONVERTER

INCORPORATION BY REFERENCE

The disclosure of Japanese Patent Application No. 2006-242104 filed on Sep. 6, 2006, including the specification, drawings and abstract, is incorporated herein by reference in its entirety.

BACKGROUND OF THE INVENTION

1. Field of the Invention

The present invention relates to a torque converter provided in a vehicle and particularly to a support structure for the stator of the torque converter.

2. Description of the Related Art

A torque converter, commonly provided in the power transmission path between the drive source and the automatic transmission of a vehicle, is a fluid drive device that multiplies the torque generated by the drive source and transmits the torque to the automatic transmission. A torque converter generally has a pump impeller that is rotatably driven by the drive source, such as an engine, a turbine runner that is rotated by operating fluid sent by the pump impeller, and a stator disposed between the pump impeller and the turbine runner. The stator converts the direction of flow of the operating fluid circulating from the turbine runner to the pump impeller to the same rotational direction as that of the pump impeller, thereby aiding the rotation of the pump impeller.

In order to achieve a compact torque converter of this type, in a structure in which a thrust bearing is provided on a side face of a one-way clutch that rotatably supports the stator at the inner periphery thereof, as in Japanese Patent Application Publication No. JP-A-2004-132526, the length in the axial direction is reduced by mounting the bearing race of the thrust bearing directly to the outer race of the one-way clutch.

In the torque converter described in Japanese Patent Application Publication No. JP-A-2004-132526, keys protruding inward from the stator are provided to prevent rotation of the outer race and the bearing race, and key grooves mating with the keys are provided in the outer race and the bearing race. It is relatively difficult to machine the keys provided on the stator, and because oil supplied from the oil passage groove of the outer race passes through the key groove, it is necessary to make the key groove of the outer race deep, making it difficult to perform the ordinarily easy task of broaching a key groove in the outer race, and resulting in an increase in the cost of the outer race.

SUMMARY OF THE INVENTION

The present invention provides an inexpensive stator support device for a torque converter in which a bearing race of a thrust bearing is mounted directly to the outer race.

A first aspect of the present invention is a stator support device for a torque converter having a stator wheel and a non-rotating member includes a one-way clutch and a bearing race. The one-way clutch includes an outer race disposed along the inner periphery of the stator wheel, an inner race connected to the outer periphery of the non-rotating member to prevent rotation of the inner race relative to the non-rotating member, and an end bearing provided between the outer race and the inner race. The bearing race is disposed at a side face of the outer race. The bearing race is rotatably supported in the circumferential direction. A gap is formed between the bearing race and the stator wheel.

According to a second aspect of the present invention, the stator support device for the torque converter provides the following features in addition to the first aspect. The inner peripheral part of the stator wheel and the outer peripheral part of the outer race may be press fitted together. The outer race may have a step part formed in the outer peripheral part thereof. The stator wheel may have a protruding part formed on the inner peripheral surface thereof and face inward in the radial direction. A side wall of the step part and a side wall of the protruding part may come into mutual contact.

According to a third aspect of the present invention, the stator support device for the torque converter provides the following features in addition to either the first or the second aspect. The end bearing may have a lubricating oil hole formed therein. The bearing race may have a plurality of bearing oil passage holes formed along the circumferential direction of a side face thereof so that the bearing oil passage holes communicate with the lubricating oil hole. The bearing race may further have a plurality of bearing oil passage grooves formed in the outer peripheral part thereof. The outer race may have a plurality of outer race oil passage grooves formed along the circumferential direction therein. The outer race oil passage grooves may communicate with the bearing oil passage holes. Lubricating oil may be supplied to the bearing oil passage grooves through the outer race oil passage grooves that communicate with at least one of the bearing oil passage holes.

According to the stator support device for the torque converter of the first aspect, because the bearing race is not prevented from rotating, it is not necessary to do complex machining such as providing a key in the stator wheel, and it is possible to reduce manufacturing cost. Also, the forming of a gap between the stator wheel and the bearing race prevents sliding friction between these members.

According to the stator support device for the torque converter of the second aspect, because the side wall of the step part, formed in the peripheral part of the outer race, and the protruding part, formed from the inner peripheral surface of the stator wheel facing inward in the radial direction, are in mutual contact, when a thrust load in the axial direction of the stator wheel is applied, the thrust load is directly transmitted to the outer race via the contacting part, thereby preventing the thrust load from being transmitted to the outer peripheral part of the bearing race, which prevents deformation of the outer peripheral part of the bearing race caused by the thrust force.

According to the stator support device for the torque converter of the third aspect, because a plurality of a bearing oil passage holes are formed in the side face of the bearing race and a plurality of bearing oil passage grooves are formed in the outer peripheral part, even if the bearing race rotates freely, the communication between the lubricating oil grooves formed in the outer race and the bearing oil passage holes is maintained, and there is communication between the oil passage grooves formed in the outer race and the bearing race oil passage holes. By forming bearing oil passage grooves, oil passes through the bearing oil passage grooves and is supplied to within the torque converter. By forming oil passage holes and oil passage grooves in this manner, it is possible to achieve a stable supply of oil.

BRIEF DESCRIPTION OF THE DRAWINGS

The foregoing and further objects, features, and advantages of the invention will become apparent from the following description of example embodiments with reference to the accompanying drawing, wherein like numerals are used to represent like elements, and wherein.

DETAILED DESCRIPTION OF THE PREFERRED EMBODIMENTS

Example embodiments of the present invention are described below, with reference made to the accompanying drawings.

Figure 1:
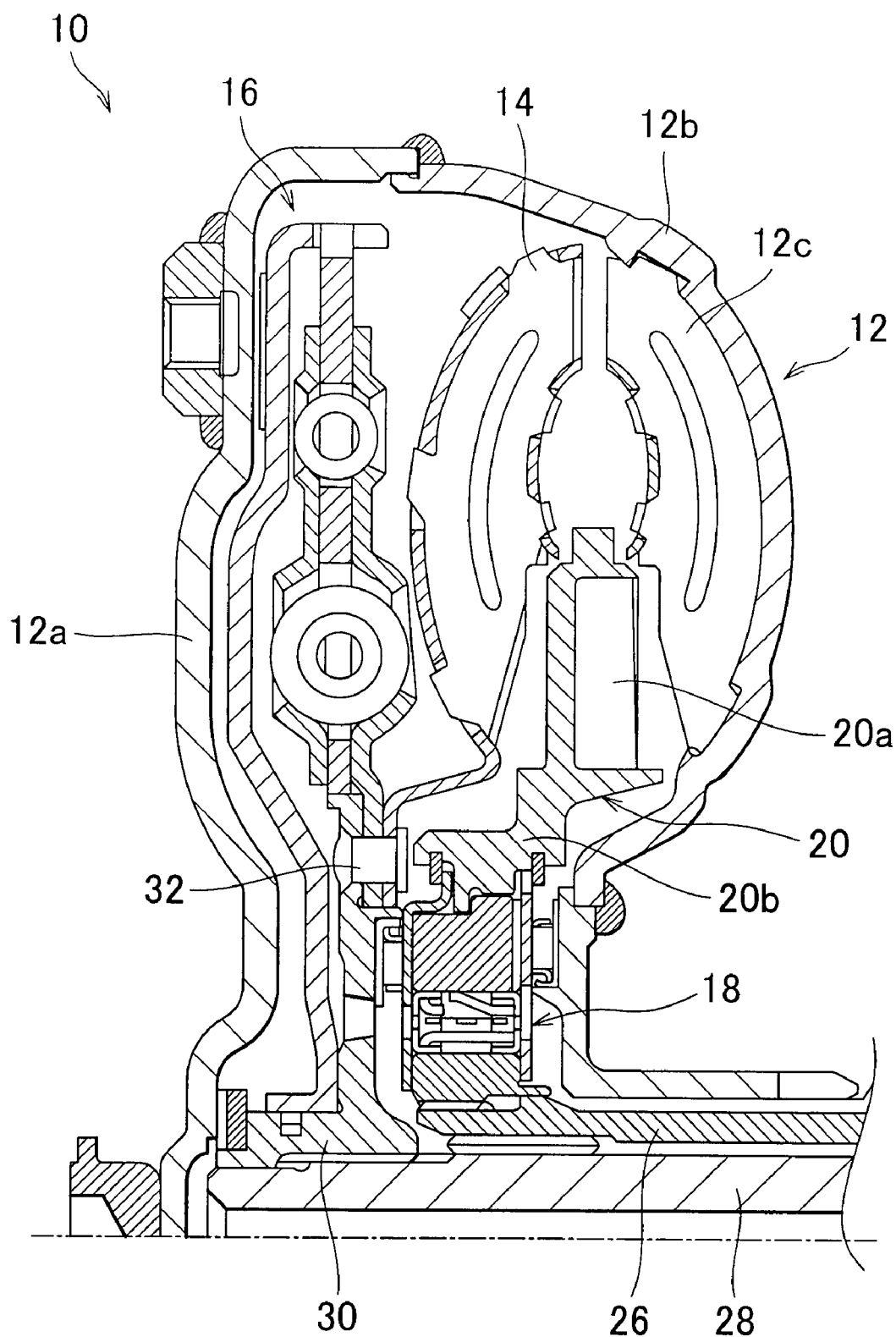
FIG. 1 is a cross-sectional view showing the configuration of a torque converter according to an embodiment of the present invention.

FIG. 1 is a cross-sectional view showing the configuration of a torque converter 10 according to an embodiment of the present invention. The torque converter 10 has a pump impeller 12, a turbine runner 14, a lock-up clutch 16, a one-way clutch 18, and a stator 20.

The pump impeller 12, for example, has a front case 12a, a rear case 12b, and an impeller wheel 12c. The front case 12a and the rear case 12b are linked to the crankshaft, to which the output of the engine (not illustrated) is transmitted, and are caused to rotate about their axes at the same rotational speed as the crankshaft. The impeller wheel 12c, having a plurality of blades, is provided around the circumference of the rear case 12b. When the engine rotates the front case 12a, the impeller wheel 12c of the pump impeller 12 is caused to rotate in concert with the front case 12a. By the rotation of the impeller wheel 12c of the pump impeller 12, the oil that fills the inside of the pump impeller 12 is pushed and caused to rotate by the impeller wheel 12c of the pump impeller 12, and is caused to be pushed outward by the centrifugal force thus generated. The operating fluid collides with the impeller wheel of the turbine runner 14 disposed opposite the pump impeller 12, the force of collision causing the impeller wheel of the turbine runner 14 to rotate, after which the operating fluid flows along the curve of the impeller wheel of the turbine runner 14, passes through the stator 20, circulating to the pump impeller 12. Thus, operating fluid is circulated through the torque converter 10.

When the pump impeller 12 starts to rotate, the difference in rotational speed between the pump impeller 12 and the turbine runner 14 is relatively large, although operating fluid from the turbine runner 14 is flowing in a direction that impedes the rotation of the pump impeller 12, because the stator 20 is provided between the pump impeller 12 and the turbine runner 14 via a one-way clutch 18 that is spline-coupled to a cylindrical fixed shaft 26 that is a non-rotating member, the flow direction of the operating fluid is converted by the impeller wheel 20a of the stator 20 to the direction that aids the rotation of the pump impeller 12. When the rotational speed of the turbine runner 14 increases and the difference between the rotational speeds of the pump impeller 12 and the turbine runner 14 is reduced, although the impeller wheel 20a of the stator 20 acts to impede the flow, the stator 20 is caused to rotate by the one-way clutch 18, so that the impeding of flow is prevented. The turbine runner 14 is joined by a rivet 32 to the turbine hub 30, which is spline-coupled to the input shaft 28 of the automatic transmission (not illustrated), which corresponds to the output shaft, and when the turbine runner 14 is caused to rotate, the rotation is transmitted via the turbine hub 30 to the input shaft 28 and to the automatic transmission (not illustrated).

Figure 2:
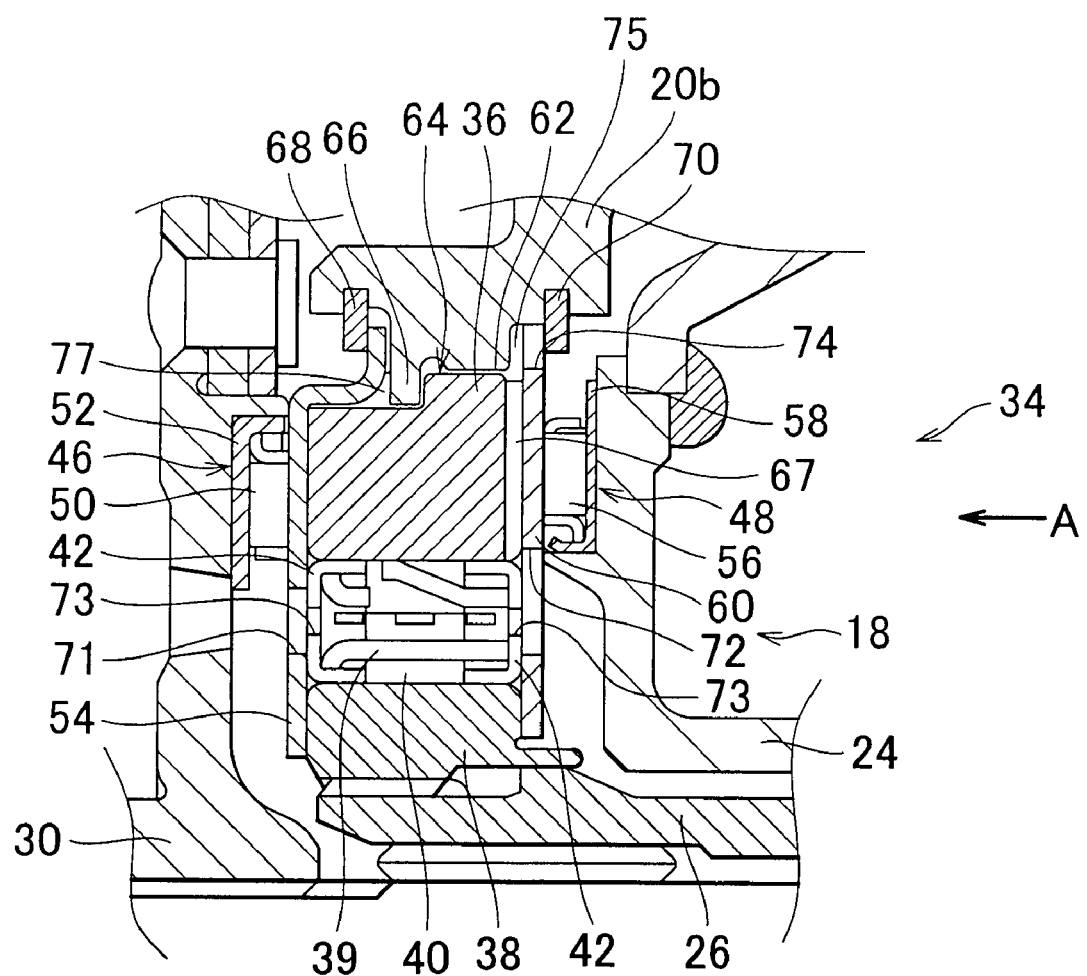
FIG. 2 is a cross-sectional view of the main parts of the stator support device of the stator shown in FIG. 1.

FIG. 2 is a cross-sectional view of the main components of the stator support device 34 that supports the stator 20 of FIG. 1 via the one-way clutch 18. The stator 20 has the plurality of impeller wheels 20a provided in the circumferential direction, and a stator wheel 20b, connected to the inner peripheral side of the stator 20, that rotates in concert with the impeller wheels 20a. The one-way clutch 18 is disposed on the inner peripheral side of the stator wheel 20b. The one-way clutch 18 has an outer race 36 that is fitted into the inner periphery of the stator wheel 20b; an inner race 38 that is fitted over the outer periphery of the fixed shaft 26, which is a non-rotating member, so that it cannot rotate; a plurality of sprags 40 held by a holding member 39 at a pre-established fixed spacing in the circumferential direction between the outer race 36 and the inner race 38, and a pair of annular end bearings 42, which are interposed between the outer race 36 and the inner race 38 so as to cover both ends of the sprags 40. A front thrust bearing 46 is interposed in the gap between the turbine hub 30 and the outer race 36 and, in the same manner, a rear thrust bearing 48 is interposed in the gap between the rear case 12b and the outer race 36. The outer race 36 is supported in the axial direction by the turbine hub 30 and the rear case 12b, via the front and rear thrust bearings 46, 48. The stator support device 34 of this embodiment is formed mainly by the above-noted elements.

The front thrust bearing 46 includes a plurality of elongated rolling members 50 disposed at a prescribed spacing in the circumferential direction with their longitudinal direction aligned along the radial direction, and a pair of first front race and second front race 52, 54, which are flat disc-shaped, that sandwich the plurality of rolling members 50. The first front race 52 is interposed between the rolling members 50 and the turbine hub 30, and the second front race 54 is interposed between the rolling members 50 and the outer race 36, so that the relative rotations are enabled.

The rear thrust bearing 48 includes a plurality of elongated rolling members 56 disposed at a prescribed spacing in the circumferential direction with their longitudinal direction aligned along the radial direction, and a pair of first rear race and second rear race 58, 60, which are flat disc-shaped, that sandwich the plurality of rolling members 56. The first rear race 58 is interposed between the rolling members 56 and the rear case 12b, and the second rear race 60 is interposed between the rolling members 56 and the outer race 36, so that the relative rotations are enabled. A plurality of outer race oil passage grooves 67 that extend through in the radial direction, to be described below, are formed at the contact interface between the outer race 36 and the second rear race 60. The second rear race 60 in this embodiment may be considered as the bearing race of the present invention.

The inner peripheral part of the inner race 38 is spline-coupled to the end part of the fixed shaft 26, which is a non-rotating member, thus preventing rotation of the inner race 38. Serrations are formed in the outer peripheral surface 62 of the outer race 36, and the outer race 36 is fitted into the inside of the stator wheel 20b by conventional serration press-fitting, so that the outer race 36 rotates as one with the stator wheel 20b. A step part 64 is formed in the outer peripheral part of the outer race 36, and an annular stopper 66 is formed on the inner peripheral surface of the stator wheel 20b that protrudes inward from the inner peripheral surface. When performing serration press fitting of the outer race 36 and the stator wheel 20b, the press fitting is done up until the point at which the side wall of the step part 64 comes into contact with the side wall of the stopper 66. The serration press fit in this embodiment may be considered as the press fitting of the present invention, and the stopper 66 may be considered as the protruding part of the present invention.

When the operating fluid within the torque converter 10 causes a thrust load to axially act on the rear case 12b side of the stator wheel 20b, the thrust load is transmitted from the stopper 66 of the stator wheel 20b, via the step part 64 of the outer race 36, to the outer race 36. The thrust load transmitted to the outer race 36 is supported by the rear thrust bearing 48. By doing this, the thrust load is not transmitted from the outer peripheral part of the second rear race 60 to the rear thrust bearing 48, thereby preventing deformation of the outer peripheral part of the second rear race 60.

The second front race 54 of the front thrust bearing 46 is fitting tightly into the outer race 36, along the side wall of the inner race 38, the side wall of the end bearing 42, and the side wall of the outer race 36, so that the second front race 54 is free to rotate in the circumferential direction. The outer peripheral edge of the second front race 54 is in contact with a snap ring 68 that is fitted into the inner peripheral surface of the stator wheel 20b, thereby preventing relative motion in the axial direction between the second front race 54 and the stator wheel 20b. In the same manner, the second rear race 60 of the rear thrust bearing 48 is fitting tightly into the stator wheel 20b, along the side wall of the inner race 38, the side wall of the end bearing 42, and the side wall of the outer race 36, so that the second rear race 60 is free to rotate in the circumferential direction. The outer peripheral edge of the second rear race 60 is in contact with a snap ring 70 that is fitted into the inner peripheral surface of the stator wheel 20b, thereby preventing relative motion in the axial direction between the second rear race 60 and the stator wheel 20b. A plurality of bearing oil passage holes 71 that communicate with the lubricating oil grooves 73, formed so as to pass through the end bearing 42, are formed in the second front race 54 in the circumferential direction. A plurality of bearing oil passage holes 72 that communicate with the lubricating oil grooves 73, formed so as to pass through the end bearing 42, are formed in the circumferential direction in the second rear race 60. Additionally, a plurality of bearing oil passage grooves 74 shaped as cutouts are formed in the circumferential direction in the outer peripheral part of the second rear race 60.

A gap 75 is formed in the axial direction between the outer peripheral part of the second rear race 60 and the inner peripheral part of the stator wheel 20b. The gap 75 is established so that, when press fitting is done to the point at which the stopper 66 of the stator wheel 20b and the step part 64 of the outer race 36 come into contact, and the second rear race 60 and outer race 36 are in close contact, the space between the stator wheel 20b and the second rear race 60 has substantially the same depth as that of the groove in the outer race oil passage grooves 67 of the outer race 36. The gap 75 prevents sliding contact between the second rear race 60 and the stator wheel 20b and forms an oil passage. Because the stator wheel 20b is made of aluminum, by preventing sliding contact with the second rear race 60, the loss of endurance life caused by aluminum wear of the stator wheel 20b is prevented. Because the outer race 36 is made of a steel material such as bearing steel, which has high wear resistance, even if there is sliding contact between the outer race 36 and the second rear race 60, there is relatively little frictional wear. Thus, sliding wear between the members is minimized.

A gap 77 is formed between the outer peripheral part of the second front race 54 and the inner peripheral part of the stator wheel 20b. The gap 77 is formed so that, when press fitting is done to the point at which the stopper 66 of the stator wheel 20b and the step part 64 of the outer race 36 come into contact, the outer peripheral edge of the second front race 54 contacts the snap ring 68. The gap 77 prevents sliding contact between the second front race 54 and the stator wheel 20b. Because the stator wheel 20b is made of aluminum, by preventing sliding contact with the second front race 54, the loss of endurance life caused by aluminum wear of the stator wheel 20b is prevented. Because the outer race 36 is made of a steel material such as bearing steel, which has high wear resistance, even if there is sliding contact between the outer race 36 and the second front race 54, there is relatively little frictional wear. Thus, sliding wear between the members is minimized.

Figure 3:
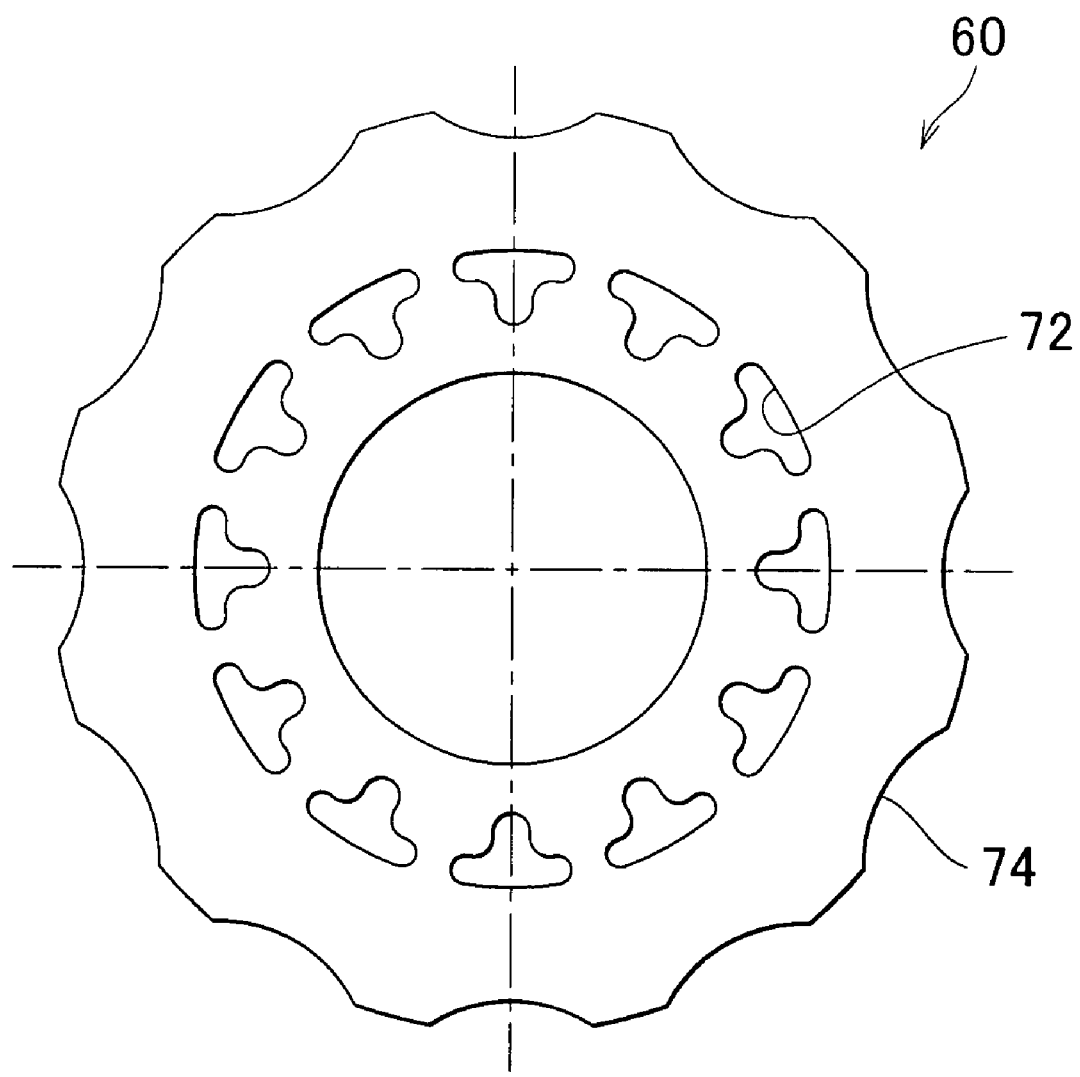
FIG. 3 is a front elevation view describing the shape of the rear race, corresponding to the view as seen in the direction of the arrow A in FIG. 2.

FIG. 3 is a front elevation view describing the shape of the second rear race 60, and corresponds to the view as seen the direction of the arrow A in FIG. 2. The second rear race 60 is made, for example, of bearing steel in the form of a round disc. A plurality of T-shaped bearing oil passage holes 72 (twelve in this embodiment) are formed in the second rear race 60 at a uniform angular spacing in the circumferential direction. Additionally, a plurality of bearing oil passage grooves (twelve in this embodiment) 74 are formed in the second rear race 60 as arc-shaped cutouts at a uniform angular spacing in the circumferential direction. Oil from the lubricating oil holes 73, formed in the end bearing 42, is supplied to the bearing oil passage holes 72.

Figure 4:
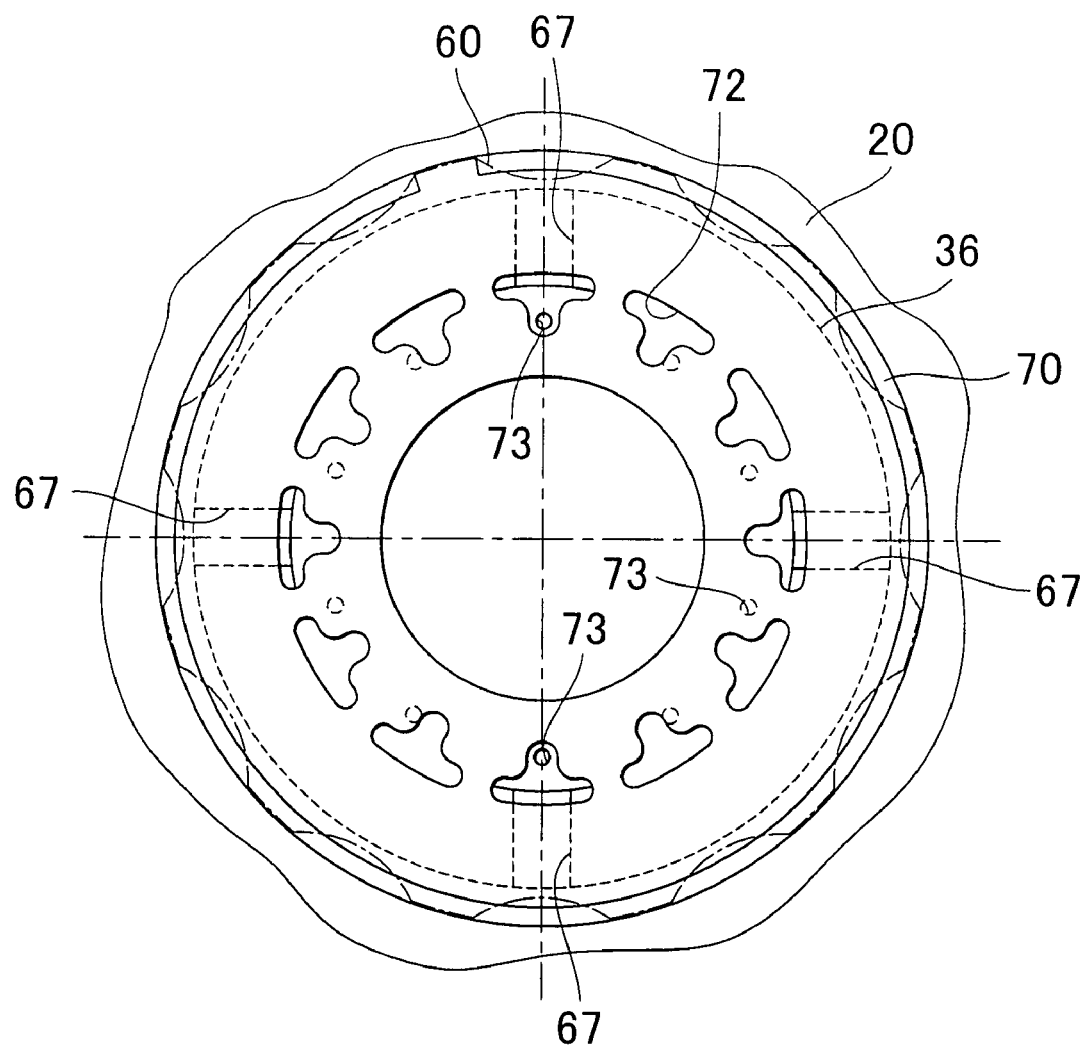
FIG. 4 is a layout drawing showing the positional relationship between the stator, the rear race, the outer race, and the snap ring, corresponding to the view as seen in the direction of the arrow A in FIG. 2.

FIG. 4 is a placement drawing showing the positional relationship between the stator wheel 20b, the second rear race 60, the outer race 36, and the snap ring 70, this corresponds to the view as seen in the direction of arrow A in FIG. 2. In FIG. 4, the inside peripheral edges of the T-shaped bearing oil passage holes 72 formed in the second rear race 60 shown with a single-dot-dash line communicate with the lubricating oil holes 73 formed in the end bearing 42 at minimally two locations (in FIG. 4, at the bearing oil passage holes 72 at the top and bottom edge sides), irrespective of their relative rotational positions. The plurality of lubricating oil holes 73 (ten in this embodiment), as shown by the solid and broken lines, are formed in the circumferential direction. A plurality of outer race oil passage grooves 67 (four at a uniform angular spacing in this embodiment) extending in the radial direction are formed in-the outer race 36 shown by the broken line, each communicating with the outer peripheral part of the bearing oil passage holes 72 of the second rear race 60.

Because the second rear race 60 and the end bearing 42 can rotate relative to one another, the positions of the bearing oil passage holes 72 of the second rear race 60 and the positions of the lubricating oil holes 73 of the end bearing 42 are constantly in mutual relative rotational motion in the circumferential direction. In this embodiment, however, because a plurality of the bearing oil passage holes 72 and a plurality of the lubricating oil holes 73 are provided in the circumferential direction, the positions are established so that at least two locations of the bearing oil passage holes 72 and the lubricating oil holes 73 communicate regardless of the positional relationship between the second rear race 60 and the end bearing 42. In the same manner, because the second rear race 60 and the outer race 36 can rotate relative to one another, the positions of the bearing oil passage holes 72 of the second rear race 60 and the positions of the outer race oil passage grooves 67 of the outer race 36 are constantly in mutual relative rotational motion in the circumferential direction. In this embodiment, however, because a plurality of the bearing oil passage holes 72 and a plurality of the outer race oil passage holes 67 are provided in the circumferential direction and also because the width of the bearing oil passage holes 72 at the outer peripheral side is increased, the positions are established so that the oil passage holes 72 and the outer race oil grooves 67 communicate at all times.

When the lock-up clutch 16 of the torque converter 10 is engaged, oil is supplied from the gap formed between the input shaft 28 and the fixed shaft 26. The oil passes through the bearing oil passage hole 71 of the second front race 54 and the lubricating oil holes 73 of the end bearing 42, and lubricates the inside of the one-way clutch 18. The oil is also supplied to the bearing oil holes 72 of the second rear race 60 through the lubricating oil holes 73 of the end bearing 42 positioned at the second rear race 60 side. Additionally, because the bearing oil passage holes 72 communicate with the outer race oil passage grooves 67 of the outer race 36, the oil passes through the outer race oil passage grooves 67 and reaches the bearing oil passage grooves 74 of the second rear race 60. Oil that reaches the bearing oil passage grooves 74 passes through the grooves and is supplied to the inside of the torque converter 10.

As described above, according to the stator support device 34 for a torque converter of this embodiment, because the second rear race 60 is not stopped from rotating, it is not necessary to perform difficult machining such as forming a key in the stator wheel 20b, and it is possible to reduce the manufacturing cost. With the gap 75 between the inner peripheral part of the stator wheel and the outer peripheral part of the second rear race 60, it is possible to prevent sliding wear between these members.

According to the stator support device 34 for a torque converter of this embodiment, the side wall of the step part 64 and the side wall of the stopper 66 are in mutual contact, when a thrust load in the axial direction is applied to the stator wheel 20b, the thrust load is transmitted directly to the outer race 36 via these contacting parts, thereby preventing the transmission of the thrust load to the outer peripheral part of the second rear race 60 and preventing deformation of the outer peripheral part of the second rear race 60.

According to the stator support device 34 for a torque converter of this embodiment, because the plurality of bearing oil passage holes 72 are formed on the side face of the second rear race 60 and also a plurality of bearing oil passage grooves 74 are formed on the outer peripheral part thereof, even if the second rear race 60 rotates freely, there is always communication between the lubricating oil holes 73 formed in the end bearing 42 and the bearing oil holes 72, and communication between the outer race oil passage grooves 67 formed in the outer race 36 and the bearing race oil passage holes 72, thereby enabling stable supply of oil.

Although example embodiments of the present invention are described above with reference to drawings, the present invention may be applied in other forms as well.

For example, although twelve T-shaped bearing oil passage holes 72 are formed in the second rear race 60 in the foregoing embodiment, there is no restriction with regard to the shape and number of these holes. The shape and number of the bearing oil passage holes 72 may be varied in any suitable manner that is not inconsistent with the stated benefits of the invention. Specifically, free variation is possible to the extent that there is efficient communication between the lubricating oil holes 73 and outer race oil passage grooves 67 and the bearing oil passage holes 72. In the same manner, with regard to the shape and number of outer race oil passage grooves 67, lubricating oil holes 73, and bearing oil passage grooves 74 in the above-described embodiments, free variation is possible to the extent that there is efficient communication between these oil holes and grooves.

Although in the foregoing embodiments the stator wheel 20b and the outer race 36 are joined together as one by serration press fitting, the present invention is not restricted to serration press fitting. The stator wheel 20b and the outer race 36 may be joined using any appropriate method, including, but not limited to, conventional press fitting or welding.

The foregoing embodiments are merely examples, and the present invention may be changed by a person skilled in the art to implement various changes and improvements.

What is claimed is:

1. A stator support device for a torque converter having a stator wheel and a non-rotating member, the stator support device comprising:
   a one-way clutch that includes an outer race, disposed along the inner periphery of the stator wheel, an inner race, connected to the outer periphery of the non-rotating member, that prevents rotation of the inner race relative to the non-rotating member, and an end bearing, provided between the outer race and the inner race, wherein the outer race has a plurality of outer race oil passage grooves formed along the circumferential direction therein; and
   a bearing race disposed at a side face of the outer race, wherein the bearing race is supported so as to be rotatable in the circumferential direction, and wherein a gap is formed between the bearing race and the stator wheel in the axial direction, a length of the gap being substantially equal to a depth of at least one of the outer race oil passage grooves.

2. The stator support device according to claim 1, wherein the inner peripheral part of the stator wheel and an outer peripheral part of the outer race are press fitted together; wherein the outer race has a step part formed in the outer peripheral part thereof; wherein the stator wheel has a protruding part formed on the inner peripheral surface thereof, the protruding part facing inwardly in the radial direction, and wherein a side wall of the step part and a side wall of the protruding part are in mutual contact.

3. The stator support device according to claim 1, wherein the end bearing has a lubricating oil hole formed therein, the bearing race has a plurality of bearing oil passage holes formed along the circumferential direction of a side face thereof, the bearing oil passage holes communicate with the lubricating oil hole, the bearing race further has a plurality of bearing oil passage grooves formed in the outer peripheral part thereof, the outer race oil passage grooves communicate with the bearing oil passage holes, and wherein lubricating oil is supplied to the bearing oil passage grooves through the outer race oil passage grooves that communicate with at least one of the bearing oil passage holes.

4. The stator support device according to claim 3, wherein the bearing oil passage holes are formed with a uniform angular spacing therebetween.

5. The stator support device according to claim 3, wherein the circumferential direction widths of the bearing oil passage holes are greater at the outer peripheral side than at the inner peripheral side.

6. The stator support device according to claim 3, wherein the bearing oil passage grooves are formed with a uniform angular spacing therebetween.

7. The stator support device according to claim 1, wherein the bearing race is prevented from moving in the axial direction relative to the stator wheel by coming into contact with a snap ring press fit into the inner peripheral surface of the stator wheel.

8. The stator support device according to claim 1, wherein the bearing race comprises bearing steel.

* * * * *